United States Patent [19]

Blundell et al.

[11] Patent Number: 5,337,707
[45] Date of Patent: Aug. 16, 1994

[54] INTERNAL COMBUSTION ENGINE

[75] Inventors: David W. Blundell, Attleborough; Neil D. Wilson, Norwich, both of United Kingdom

[73] Assignee: Group Lotus PLC, Norwich, United Kingdom

[21] Appl. No.: 941,422

[22] PCT Filed: Apr. 26, 1991

[86] PCT No.: PCT/GB91/00667

§ 371 Date: Oct. 27, 1992

§ 102(e) Date: Oct. 27, 1992

[87] PCT Pub. No.: WO 90/14512

PCT Pub. Date: Nov. 29, 1990

[30] Foreign Application Priority Data

Apr. 27, 1990 [GB] United Kingdom ............... 9009562

[51] Int. Cl.⁵ ............................................. F02B 75/02
[52] U.S. Cl. .............................. 123/65 PE; 123/65 V
[58] Field of Search ............... 123/73 V, 65 PE, 65 V

[56] References Cited

U.S. PATENT DOCUMENTS

| | | | |
|---|---|---|---|
| 1,514,476 | 4/1924 | Still | 123/65 PE |
| 3,905,341 | 9/1975 | Boyesen | 123/73 |
| 4,121,552 | 10/1978 | Mithuo et al. | 123/65 |
| 4,202,297 | 5/1980 | Oku et al. | 123/65 PE |
| 4,285,311 | 8/1981 | Iio | 123/323 |
| 4,321,893 | 3/1982 | Yamamoto | 123/65 PE |
| 4,325,335 | 4/1982 | Shibata | 123/323 |
| 4,333,431 | 6/1982 | Iio et al. | 123/323 |
| 4,364,346 | 12/1982 | Shiohara | 123/323 |
| 4,388,894 | 6/1983 | Tanaka et al. | 123/65 PE |
| 4,391,234 | 7/1983 | Holzleitner | 123/65 PE |
| 4,399,788 | 8/1983 | Bostelmann | 123/323 |
| 4,516,540 | 5/1985 | Nerstrom | 123/65 PE |
| 4,672,924 | 6/1987 | Hiasa et al. | 123/65 PE |
| 4,672,925 | 6/1987 | Miyata et al. | 123/65 PE |
| 4,768,473 | 9/1988 | Yamamoto et al. | 123/65 PE |
| 4,829,193 | 5/1989 | Nishi | 250/548 |
| 4,829,946 | 5/1989 | Boyesen | 123/65 PE |
| 4,909,193 | 3/1990 | Boyesen | 123/65 PE |
| 4,911,115 | 3/1990 | Boyesen | 123/65 PE |
| 4,924,819 | 5/1990 | Boyesen | 123/65 PE |

FOREIGN PATENT DOCUMENTS

| | | |
|---|---|---|
| 0174149A2 | 3/1986 | European Pat. Off. . |
| 0413318A1 | 8/1990 | European Pat. Off. . |
| 58-180721 | 1/1984 | Japan . |
| 61-4819 | 10/1986 | Japan . |
| WO88/01682 | 3/1988 | PCT Int'l Appl. . |
| WO89/02518 | 3/1989 | PCT Int'l Appl. . |
| WO90/14512 | 11/1990 | PCT Int'l Appl. . |
| WO90/14513 | 11/1990 | PCT Int'l Appl. . |
| 171838 | 12/1921 | United Kingdom . |
| 474580 | 11/1937 | United Kingdom . |
| 689972 | 4/1953 | United Kingdom . |
| 2145467A | 3/1985 | United Kingdom . |
| 2234293A | 1/1991 | United Kingdom . |
| WO91/17348A1 | 11/1991 | United Kingdom . |

OTHER PUBLICATIONS

"The High-Speed Two–Stroke Petrol Engine" by Philip H. Smith, A.M.I.Mech.E.
"Improvement of Two–Stroke Engine Performance with the Yamaha Power Valve System (YPVS)" by Noriyuki Hata and Toshimitsu Iio, Yamaha Motor Co., Ltd.

Primary Examiner—Noah P. Kamen
Attorney, Agent, or Firm—Westman, Champlin & Kelly

[57] ABSTRACT

The present invention includes an internal combustion engine having at least one piston reciprocating within a cylinder, and an exhaust port allowing communication of the cylinder with an exhaust passage. A moveable shutter is provided to vary the effective area of the exhaust port. The shutter varies the effective area cyclically in a timed relationship to the reciprocal motion of the piston within the cylinder. A sensor is provided to measure an operating characteristic of the engine and to generate signals responding to the operating characteristic sensed. A control unit is provided to process the signals and to control the motion of the shutter in response to the signals.

31 Claims, 3 Drawing Sheets

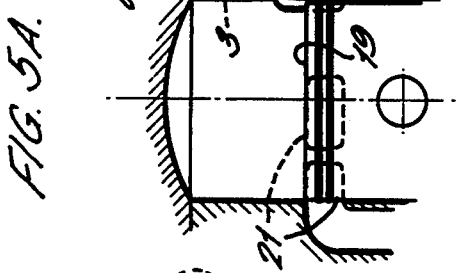
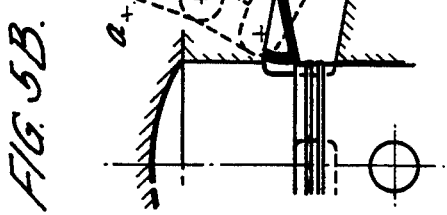
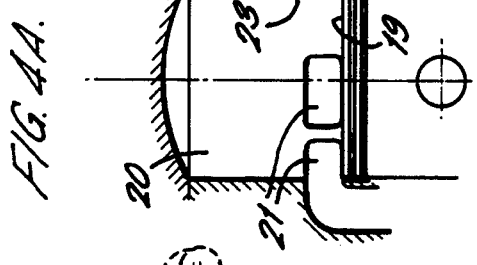
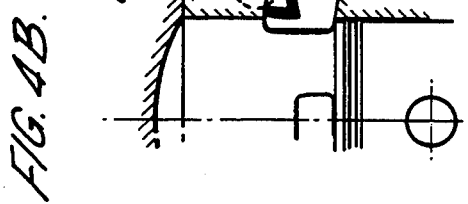
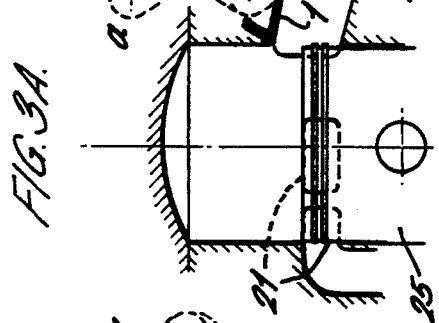
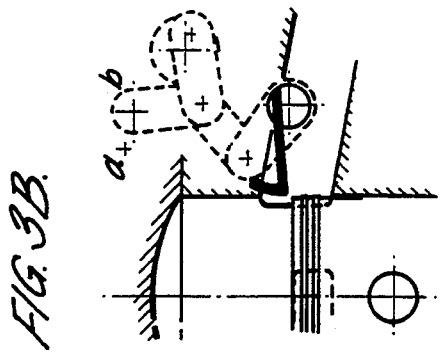
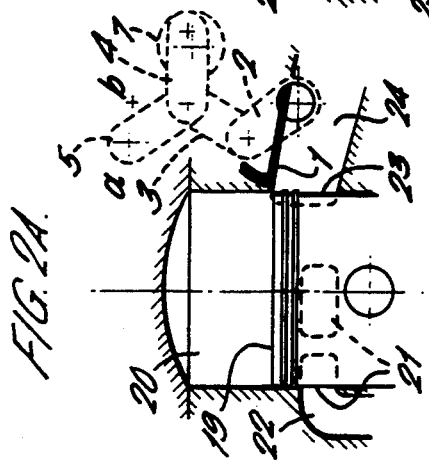
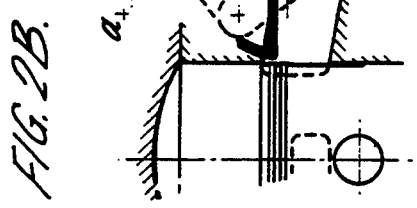

INTERNAL COMBUSTION ENGINE

BACKGROUND OF THE INVENTION

The invention relates to internal combustion engines and more particularly to an arrangement for varying the area of an exhaust port of a cylinder of such.

The invention relates to "ported" engines rather than "valved" engines and therefore since two-stroke engines more commonly use ports instead of valves the invention will be discussed with reference to a two-stroke engine, although it should be appreciated that the invention should not be considered limited to such.

A major disadvantage of the type of two-stroke engine well-known in the prior art is the loss of fuel/air mixture from the cylinder that occurs during scavenging of the engine. In a standard two-stroke engine the skirt of the piston serves to close the ports in the cylinder, one or more of these ports serving to provide a passage for the injection of a fresh charge of fuel/air mixture to the cylinder and one or more other ports serving to provide an exhaust outlet for the combusted gases. The transfer ports and exhaust ports are arranged in the cylinder so that on downward movement of the piston the exhaust ports are uncovered first, the high pressure differential between the gases in the cylinder and atmospheric pressure causing the combusted gases to flow out of the cylinder into an exhaust passage which leads to an exhaust pipe which delivers the gases to the atmosphere. On further downward motion of the piston the transfer ports are uncovered enabling a fresh charge of pressurised fuel/air mixture to be delivered to the cylinder for combustion. The fuel/air mixture is commonly pressurised in the crankcase of the engine by the downward motion of the piston but could be equally well pressurised by a supercharger or turbocharger. The pressurised delivery of gas also serves to force combusted gases from the cylinder, a process known as scavenging.

The disadvantage of the type of operation described above is that a considerable amount of fuel is unnecessarily exhausted from the cylinder without undergoing combustion. The time during which both the transfer and the outlet ports are uncovered is controlled solely by the motion of the actual piston itself, the only means of closing the apertures being provided by the piston. When the piston moves towards the top of the cylinder it closes first the transfer ports and secondly the exhaust ports. During the period between the closure of the transfer and exhaust ports the piston drives from the cylinder through the exhaust ports some of the fresh charge that has been delivered by the transfer ports.

Further disadvantages of the known two-stroke engine occur since compression of the charge cannot commence until the piston has passed the top of the exhaust port or the top of the uppermost of a plurality of exhaust ports. This is disadvantageous since the peak pressures in the cylinder are limited and hence the thermal efficiency of the engine adversely affected.

Attempts to deal with the above mentioned problems have been disclosed in U.K. application no. GB 2145 467A and also in International Application No. PCT/US88/03136.

In GB 2145 467A there is disclosed an exhaust valve wherein a shutter is arranged to be introduced into an exhaust passage of a two-stroke engine, varying the effective area of the exhaust port of a cylinder of the engine. The effective area of the exhaust port is the area of the port through which gases can pass to the exhaust passage. The exhaust port itself will have a fixed total area since it is an aperture machined in the wall of the cylinder. However the shutter of GB 2145 467A uses a shutter to close the same exhaust port area to reduce the effective area of the port. The motion of the shutter is synchronised with the motion of the piston moving within the cylinder. The shutter begins to reduce the effective area of aperture as the piston commences to uncover the transfer port. The shutter further reduces the effective area of the exhaust port as the piston continues its downward motion and commences its upward motion. The shutter begins to increase the effective area of the exhaust port after the piston has passed the exhaust port and it is sealed by the piston skirt. The arrangement disclosed serves to decrease the amount of fuel/air mixture exhausted from the cylinder before combustion and to increase the peak pressure of the gas in the cylinder. However, the effectiveness of the arrangement is limited since the shutter motion is synchronised with piston motion and cannot be adjusted in response to varying engine parameters such as engine speed and engine load.

In International Application No. PCT/US88/03156 an exhaust valve arrangement is disclosed wherein a shutter is used to reduce the effective area of the exhaust port of a cylinder of a two-stroke engine. The motion of the shutter is substantially synchronised with the motion of the piston in the cylinder. The application discloses a mechanical system whereby the timing of the shutter motion is varied automatically with engine speed, the system acting to introduce a phase difference between the oscillation of the shutter and the oscillation of the piston.

SUMMARY OF THE INVENTION

The invention provides an internal combustion engine comprising at least one piston reciprocating within a cylinder and an exhaust port allowing communication of the cylinder with an exhaust passage, wherein movable shutter means is provided to vary the effective area of the exhaust port, which shutter means varies the effective area cyclically in a timed relationship to the reciprocal motion of the piston within the cylinder, characterised in that sensor means is provided to measure one or more operating characteristics of the engine and to generate signals corresponding thereto and a control unit is provided to process the signals and to control the motion of the shutter means accordingly.

The invention thus provides a system which is responsive to varying operating characteristics of the engine and is able to vary shutter motion to give optimum performance.

As discussed above the "effective area" of the exhaust port is the area through which gases may pass to the exhaust passage. The exhaust port itself will have a fixed area, being an aperture machined in the side of the engine's cylinder. The shutter means of the invention acts to vary the effective area of the exhaust port.

Preferably the control unit controls the shutter means to alter the amount by which the effective area of the exhaust port is varied in each cycle.

Preferably the control unit controls the shutter means to alter the timed relationship between the cyclical motion of the shutter means and the reciprocal motion of the piston.

Preferably the shutter means comprises a shutter member which is cyclically introduced into the exhaust passage to vary the aperture of the exhaust port and a transmission means for transmitting motion from a crankshaft connected to the piston of the engine to the shutter member.

Preferably the shutter means has a shutter member which is introduced into the exhaust passage to vary the area of the exhaust port and oscillates between a first position in which the exhaust port has a first effective area and a second position in which the exhaust port has a second smaller effective area, the magnitude of the displacement of the shutter member between the first and second positions being controlled by the control unit.

In a preferred embodiment the internal combustion engine operates in a two-stroke cycle and the shutter oscillates between a second position in which the lower level of the shutter member is at or below the highest level of the uppermost transfer port present in the cylinder and a first position varied by the control unit.

Preferably the shutter means comprises a shutter member and a transmission mechanism for oscillating the shutter member between two positions, which transmission mechanism is powered by the output crankshaft of the engine and which comprises a plurality of interconnected links and an electro-mechanical device connected to one of the interconnected links and controlled by the control unit to alter the configuration of the interconnected links to vary the cyclical motion of the shutter member.

The transmission mechanism preferably comprises a first shaft on which the shutter member is rotatably mounted for reciprocal motion on rotation of the first crankshaft and a second shaft connected by pulley means to the output crankshaft of the engine, the first and second shafts being connected by the plurality of interconnected links.

The invention also provides an internal combustion engine comprising at least one piston reciprocating within a cylinder and an exhaust port allowing communication of the cylinder with an exhaust passage, wherein movable shutter means is provided to vary the aperture area of the exhaust port, characterised in that sensor means is provided to measure one or more operating characteristics of the engine and to generate signals corresponding thereto and a control unit is provided to process the signals and to control the shutter means to vary the effective area of the exhaust port whereby the period in the reciprocal cycle of the engine during which the cylinder communicates with the exhaust passage is varied as a function of one or more operating characteristics of the engine.

In a simplified version of the invention the shutter means does not vary the effective area of the exhaust port in a cyclical manner in timed relationship to the reciprocal motion of the piston but instead just varies the effective area having regard to measured engine operating characteristics. This can be advantageous for instance in providing a simple method to limit hydrocarbon emissions on a cold day, as will be described hereinafter.

Preferably the sensor means measures engine speed and generates a signal corresponding thereto.

Preferably the sensor means measures engine load and generates a signal corresponding thereto.

Preferably the sensor means measures the temperature of coolant used in the engine and generates a signal corresponding thereto.

Preferably the sensor means measures the rotational speed of the output crankshaft of the engine to measure engine speed and measures the pressure of the gases in an inlet manifold of the engine to measure engine load.

Preferably the shutter means comprises an electro-mechanical device controlled by the control unit to vary the operation of the shutter means.

The present invention further provides an internal combustion engine comprising at least one piston reciprocating within a cylinder connected and an exhaust port allowing communication of the cylinder with an exhaust passage, wherein shutter means is provided to vary the effective area of the exhaust port, which shutter means comprises a shutter member pivotally mounted within a recess in the exhaust passage and a transmission mechanism to reciprocate the shutter member between a first position in which the shutter is disposed at least partially within the recess and a second position in which the shutter extends out of the recess to reduce the effective area of the exhaust port, wherein the transmission mechanism comprises a first shaft attached to the shutter member, a first link pivotally connected at one end to the first shaft and pivotally connected at the other end to a first end of a second link, the second link being pivotally connected at a second end thereof to third and fourth links, the third link being pivotally connected to a crankshaft which is connected to the working crankshaft of the engine and rotates therewith and the fourth link being mounted for rotation about a fixed axis at the end opposite its pivotal attachment to the second and third links, rotation of the fourth link about the fixed axis varying the geometrical interconnection of the links such that the first position of the shutter is varied. The fourth link is preferably rotated about the fixed axis by an electro-mechanical device controlled by an electrical or electronic controller, which controller varies the second position of the shutter with changes in engine speed, and/or load and/or temperature.

The invention in its third aspect provides a system whereby shutter motion can be varied simply by rotation of a link of the transmission mechanism connected to the shutter.

In a preferred embodiment the electro-mechanical device is a servo-motor.

BRIEF DESCRIPTION OF THE DRAWINGS

Preferred embodiments of the present invention will now be described with reference to the accompanying drawings, in which:

FIGS. 2A to 5A are simplified diagrammatic cross-sections of a piston and cylinder arrangement according to the invention showing the arrangement at different stages during a cycle.

FIGS. 2B to 5B are simplified diagrammatic cross-sections of a piston and cylinder arrangement according to the invention showing the same sequence as FIGS. 2A to 5A but with the arrangement adjusted to account for a change in an operating characteristic of the engine.

DETAILED DESCRIPTION OF THE PREFERRED EMBODIMENTS

Figure 1:
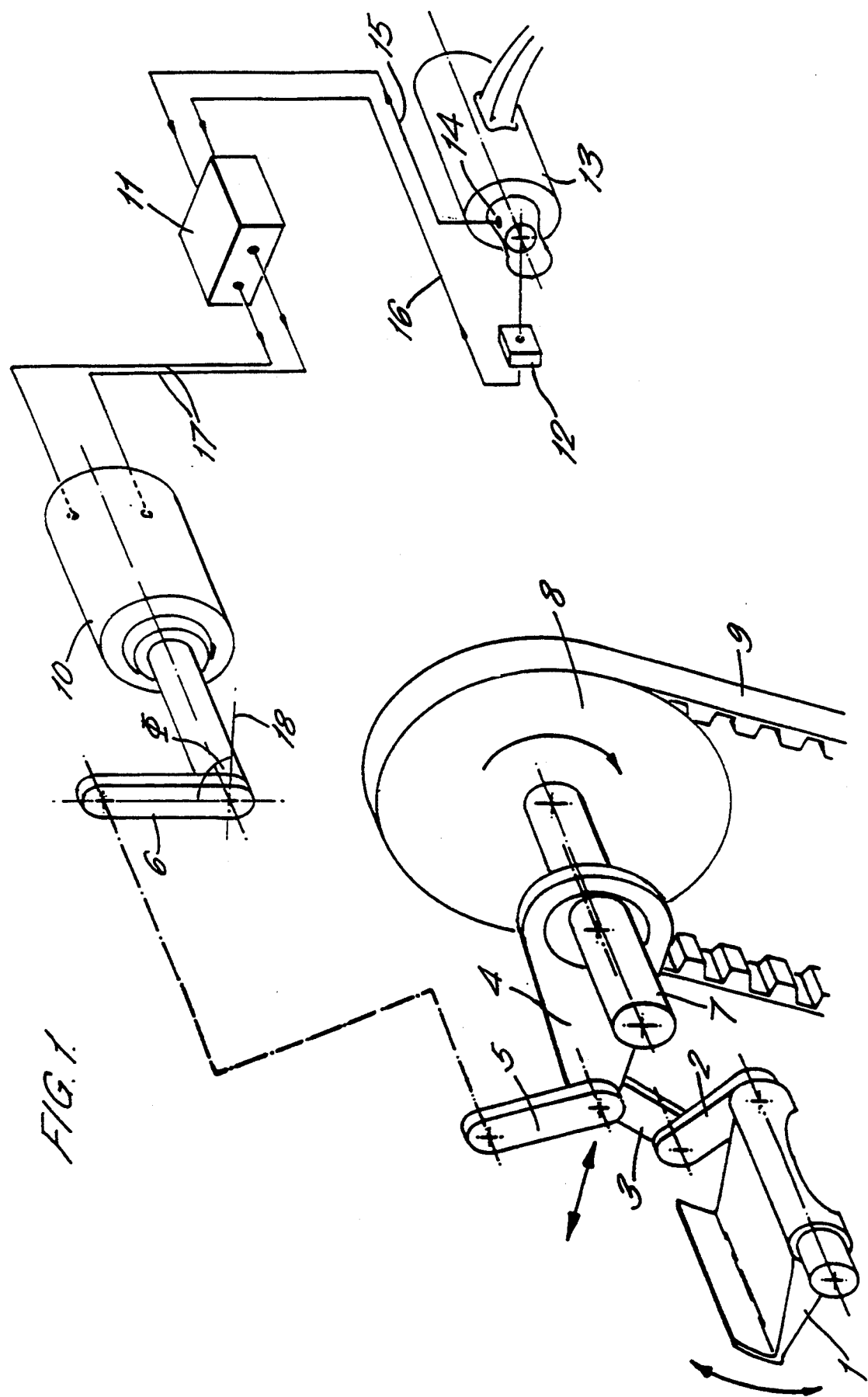
FIG. 1 is a schematic representation of one embodiment of the invention.

FIG. 1 shows a shutter 1, a first link 2 a second link 3 a third link 4, a fourth link 5, a fifth link 6 a crankshaft 7, a pulley 8, a belt 9 driven from the engine output crankshaft (not shown), a servo motor 10 a control unit 11, sensors 12 and 14 and an inlet manifold 13. An electrical sensor 14 is disposed in the inlet manifold to measure the gas pressure therein. The sensor sends a signal via a line 15 to the control unit 11. An engine speed sensor 12 measures the rotational speed of the engine in which the arrangement is present. The engine speed sensor 12 sends a signal to the control unit 11 via a line 16. The control unit 11 comprises electronic circuiting which compares and combines the signals it receives in accordance with pre-programmed instructions. The control unit 11 sends an instruction signal to servomotor 10 via lines 17. The signal instructs the servomotor to rotate the fifth link 6 to a required angle . with regard to an arbitrary fixed reference 18.

Referring to FIGS. 2A and 5A the method of operation of shutter 1 can be seen. FIG. 2A shows a piston 19, a cylinder 20, a plurality of transfer ports 21, transfer passage 22, an exhaust port 23 and an exhaust passage 24 as well as the previously mentioned shutter 1, first link 2, second link 3, third link 4, fourth link 5 and crankshaft 7. The figure is simplified for purposes of clarity and does not shown the servo-motor 10, the control unit 11, the electrical sensors 12 and 13 or the fifth link 6. The transfer ports 21 are connected directly to the transfer manifold (not shown). The fourth link 5 is connected to the servo motor (not shown) by fifth link 6. The piston 19 is connected via a conventional gudgeon pin and connecting rod (not shown) to an output crankshaft (not shown). As already explained the output crankshaft is connected by the pulley belt to the crankshaft 7.

FIG. 2A shows the piston 19 at a point when the piston and piston skirt 25 just covers the exhaust port 23. Typically this occurs when the output crankshaft has rotated 85° from top dead centre. The piston skirt 25 covers completely the inlet ports 21. The shutter 1 is withdrawn into the wall of exhaust passage 24. The gases in the cylinder in FIG. 1 have been combusted.

FIG. 3A shows the piston 19 at a point when it has moved downward from its position in FIG. 2A, on rotation by roughly 28° of the output crankshaft. Since the crankshaft 7 is connected to the output crankshaft, the crankshaft 7 has rotated a corresponding degree, causing corresponding motion of the four links 2 to 5. The motion is not however sufficient to cause the shutter 1 to enter the exhaust port 24. The exhaust port 23 has been uncovered by the piston 19 and hence the combusted gases present in the cylinder at high pressure flow out of the cylinder through the exhaust port 23.

FIG. 4A shows the piston when it has moved downward from its position in FIG. 3A to bottom dead centre. The piston 19 has uncovered the transfer ports 21 and pressurised fuel/air mixture can enter the cylinder 20 through the transfer ports 21. The pressurised fuel/air mixture drives remaining combusted gases from the cylinder into the exhaust passage 24. However, excessive loss of fuel/air mixture is prevented by the reduction of the effective area of the exhaust port 23 by the shutter 1. The reduction in the effective area of the exhaust port occurs since movement of the output crankshaft with the downward motion of the piston 19 between FIGS. 3A and 4A has caused the crankshaft 7 to move by the previously mentioned pulley and belt means. The movement of the crankshaft 7 causes motion of the links 2, 3, and 4 in such a way that the shutter 1 is pivotted into the exhaust passage 24, reducing the effective area of the exhaust port 23.

In FIG. 5A the piston 19 has begun its upward motion and the piston skirt 25 has closed the transfer port 21. Typically this would occur after the output crankshaft has rotated 247° from Top Dead Centre. The motion of the piston between FIG. 5A and FIG. 4A causes a rotation of the output crankshaft which results in a corresponding rotation of the crankshaft 7. The rotation of the crankshaft 7 via the link members 2, 3 and 4 causes the shutter 1 to rotate from the position shown in FIG. 4A and further decrease the effective area of exhaust port 23. The reduction in effective area of the exhaust port 23 by the shutter 1 enables the piston 19 to close the port 23 at an earlier stage in its upward motion than would have otherwise been possible. The earlier closure of the port enables a longer period of compression of the fuel/air mixture, allowing a higher peak pressure to be achieved and greater engine thermal efficiency.

FIG. 2B shows the piston in the same position relative to the cylinder as 2A. However, the shutter position does not correspond to that of FIG. 2A. The control system has acted to take account of engine load and engine speed and has caused the servo-motor to rotate the fifth link arm 6 such that the configuration of the four link arms 2 to 5 is adjusted. The adjustment of the geometrical arrangement of the four link arms 2 to 5 from that of FIGS. 2A to 2B reduces the extent of shutter travel. The geometry of the arrangement is such that the maximum reduction of area of the exhaust port 23 by the shutter 1 is the same for all positions of the controlling fifth link 6. However, when the fourth link 5 is in the position shown in FIGS. 2B to 5B the shutter is never fully retracted into the wall of the exhaust passage as shown in FIG. 2A. The decreased shutter travel of FIGS. 2B to 5B allows less fuel/air mixture to be exhausted without combustion than the full shutter travel of FIGS. 2A to 5A. It also allows the time at which the interior of the cylinder is open to the atmosphere to be delayed when compared with both a normal two-stroke engine and also when compared with the arrangement of FIGS. 2A to 5A. This is advantageous in that the torque produced by the engine is increased since the pressure of the expanding gases acts on the piston for a longer period. However, the delay may lead to contamination of the fuel/air mixture with combusted gases.

In a preferred embodiment of the present invention the level of lowest part of the shutter 1 when at its lowest level corresponds to a point below the highest point of the transfer apertures 21. The shutter is at its lowest position just after the piston fully closes the transfer apertures 21 on its upstroke. However, the exhaust passage is opened to the cylinder before the piston uncovers the transfer apertures on its downstroke. This allows exhaustion of combusted gases before the fresh charge of fuel/air mixture is delivered. Therefore the timing of the opening and closing of the exhaust port is "asymmetric" with respect to piston position. The exhaust port is opened when the piston is at a higher position with respect to the cylinder in its downstroke than the position of the piston when the exhaust port is closed in its upstroke.

One advantage of the present invention is that the system allows asymmetric timing of the movement of the shutter with respect to the position of the piston, and varies the asymmetry in accordance with varying engine parameters such as load speed and temperature.

The configuration of FIGS. 2A to 5A is best suited for use in an engine operating at high speeds and/or high loads. At high speeds the time available for exhaustion of combusted gases is less than at low speeds and hence the shutter should be retracted fully so as not to hinder the exhaust process. Also, the speed of the piston at higher revolutionary rates is such that both the exhaust ports and transfer ports are open simultaneously for only a brief time period and therefore the problem of exhaustion of fuel/air mixture before combustion is not so pronounced. At low speeds and for low load operations of the engine the time period in which both the transfer and exhaust ports are open is increased and hence the arrangement of the shutter shown in FIGS. 2B to 5B is best suited. In this arrangement the partially closed shutter acts to limit the amount of fuel/air mixture exhausted without combustion. The period available for exhaustion of combusted gases is longer than at high speeds and hence the partial closure of the exhaust port does not detrimentally obstruct the exhaustion of combusted gases. The arrangement of FIGS. 2B to 5B also increases the torque provided by the engine at low speeds since the opening of the exhaust passage to the cylinder is delayed and hence the period during which the expanding combusted gases act on the piston increased.

The present invention allows the shutter system to operate in an efficient manner throughout a large range of engine speeds, the electronic circuitry determining, according to pre-programmed instructions the best compromise between expanding the exhaust stroke and hence the torque delivered and increasing the time/area available for exhaustion of the spent combustion gases, with its corresponding reduction in the amount of residual exhaust gas contamination of the fresh charge.

At low engine speeds the decreased shutter movement allows the pressure on the piston due to expansion of the combusted gases to provide power for a greater fraction of the engine cycle by the partial closure of the exhaust port on the downward motion of the piston. The instant in the cycle at which the exhaust port is open to the interior of the cylinder can be delayed for up to approximately 14° rotation of the output crankshaft as compared with an arrangement without a shutter. At higher engine speed and/or load such delay may cause problems due to contamination of the fresh charge of fuel/air mixture and therefore the present invention reduces the amount of delay with speed and/or load.

Figure 7:
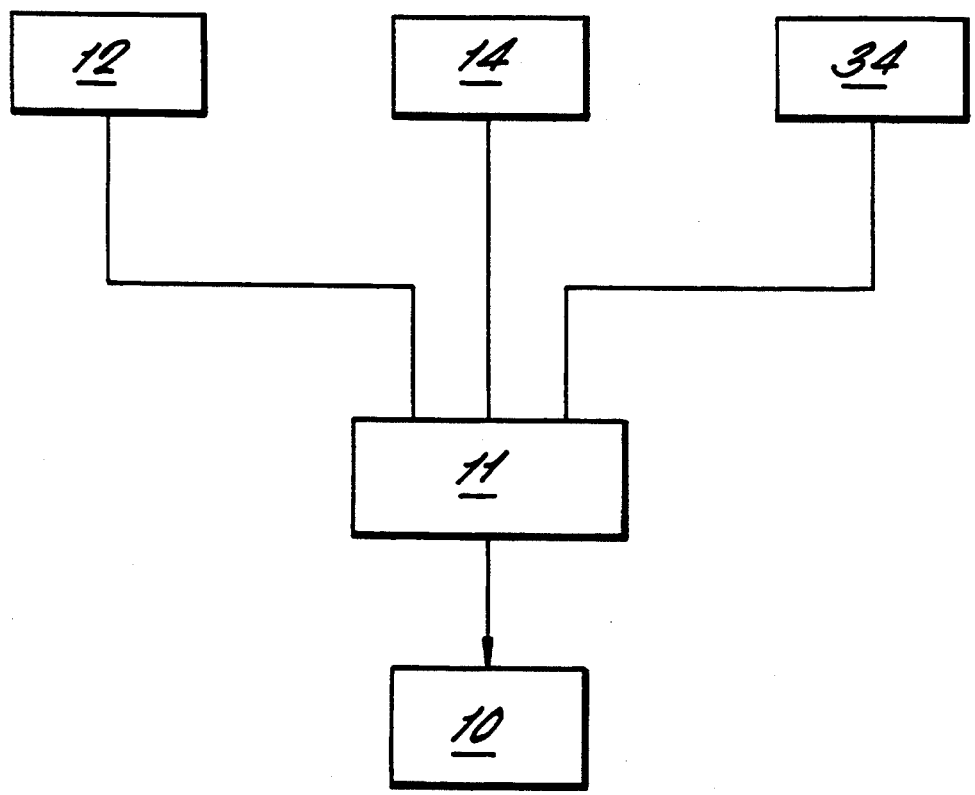
FIG. 7 shows a typical control scheme for an embodiment of the invention.

A control schematic for the control unit 11 is shown in FIG. 7. In a preferred embodiment the control system of the invention incorporates three sensors 12, 14 and 34. The sensor 12 measures engine speed typically by measuring the speed of rotation of the crankshaft rotated by the working pistons of the engine. The sensor 14 measures engine load for instance by measuring the pressure of gases in the inlet manifold (as shown in FIG. 1) or by an airflow meter monitoring flow of gases into the cylinder. The sensor 34 measures the temperature of the coolant of the engine.

The control unit 11 controls the servo-motor 10 to vary the point at which the shutter opens the exhaust passage to the working cylinder. The exhaust passage opening point is calculated in terms of degrees before piston bottom dead centre and is approximately proportional to the sensed engine speed, with maximum engine speed requiring maximum travel of the shutter 1 and maximum opening time for the exhaust aperture. The control unit 11 of the preferred embodiment will have a preprogrammed mapping table and will select the correct adjustment of the operation of the shutter by referencing the signals it receives onto a mapping table. The mapping table contains for each combination of sensed signals a preferred amplitude of oscillation of the shutter or preferred timed relationship between the cyclical motion of the shutter and the reciprocal motion of the piston. The mapping table is determined by experiment.

It has been found beneficial with a steady engine speed signal and an increased engine load to the control of the shutter to open the exhaust port at a greater degree before bottom dead centre, i.e. earlier in the downward motion of the piston, to exhaust a greater mass of combusted gases. The control unit determines the exhaust passage opening time for in terms of degrees B.B.D.C. (Before Bottom Dead Centre) from the mapping table described above stored in memory.

It has also been found beneficial to use the coolant temperature signal to ensure that the exhaust port opening point is kept to a minimum in terms of degrees before bottom dead centre, to keep to a minimum hydrocarbon emissions. An increase in coolant temperature indicates that the hydrocarbons in the working cylinder are being more efficiently burnt and therefore the shutter can open the exhaust passage earlier. The upper level of the shutter 1 is effectively varied with temperature by the mapping table of the control unit 11, the control unit 11 "capping" the position of the shutter 1 as required by the engine speed and load if such motion would allow undue hydrocarbon emmisions due to the low operating temperature of the signal.

Whilst the preferred embodiments described above uses a servo-motor to rotate the link, any electro-mechanical device could be used that could rotate a link in the required manner. For instance, the hydraulic actuator could be used, the piston of such actuator being connected to a link pivotted roughly halfway along its length, movement of the piston causing the link to rotate about its pivotal axis.

It is further envisaged by the applicant that a sensor could be used in the exhaust passage to monitor the constituents of the exhaust gases. It is commonly desired to limit the nitric oxide emissions of the engine. The shutter could be used to vary the exhaust gas retention in the working cylinder to ensure limitation of nitric oxide emissions.

Whilst above in the preferred embodiment the shutter 1 is cyclically oscillated in a timed relationship with the working piston the applicant envisages a simplified system which varies the effective area of the exhaust port with a shutter that does not cyclically oscillate. Whilst the opening of the exhaust passage for communication with the cylinder of such a system may not be asymmetric the system may be used for instance as a cheap method of limiting hydrocarbon emissions on starting of an engine, the control unit varying the position of the shutter in accordance with coolant temperature. The shutter portion could be similarly varied with engine speed and/or load in any other engine operating characteristic.

Whilst above the preferred embodiment is used for a two-stroke engine the invention is equally applicable to vary the area of an exhaust port of a four-stroke engine.

Whilst in the preferred embodiment discussed above the amplitude of the oscillation of the shutter is varied with engine speed and/or load and/or temperature, the applicant envisages a system wherein the electromechanical device is used to introduce a phase lag between the oscillation of the shutter and the oscillation of the piston instead of varying the amplitude of oscillation of the shutter. By introduction of a phase lag the exhaust passage can be opened at an earlier point in the downward motion of the piston with increasing engine speed and/or load and/or temperature. It is also envisaged that the electro-mechanical device could be controlled to vary the amplitude of oscillation of the shutter in accordance with engine speed and/or load and/or temperature and also to introduce a phase lag between the oscillation of the shutter and the piston by varying the timing of the shutter with engine speed and/or load and/or temperature.

To obtain the full advantage of the invention disclosed herein, the shutter should be formed so that the shape of its lower edge conforms as closely as possible to the shape of the top of the exhaust passage, such that when the shutter is retracted and the exhaust apertures initially opened in the high speed operation mode, the gas velocity being at its highest, there is a minimum of disturbance of the flow passing through the exhaust passage. This way, the performance of the engine is not detrimentally effected by obstruction of the flow of the combusted gases through the exhaust passage.

Figure 6:
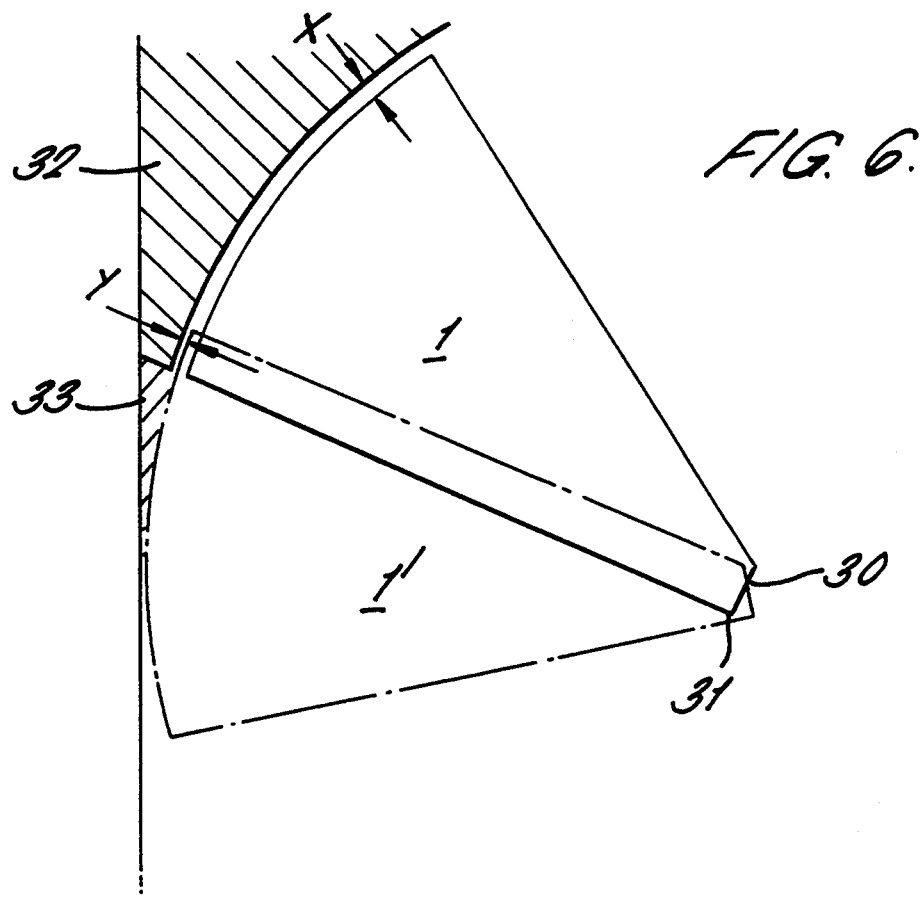
FIG. 6 shows a detail of a preferred embodiment of the invention.

A detail of a preferred embodiment of a shutter arrangement can be seen in FIG. 6. In FIG. 6 the shutter is mounted such that it pivots about the point 30, which is eccentric of the point 31 on the lowermost edge of the shutter 1. The shutter 1 can be seen in its retracted position within the recess in the exhaust passage and also at 1' in a second position reducing the area of exhaust port. The clearance between the shutter and the housing 32 is reduced as the shutter reaches its lowermost point due to the offset. This can be seen at X and Y in the FIG. 6, X showing the clearance that would prevail without offset and Y showing the clearance that prevails with offset. This has the advantage of reducing the volume 33 formed between the piston and the shutter which is a source of hydrocarbon emissions through the exhaust passage and a loss of power. It also has the advantage of reducing the leakage path between the shutter and the working position.

The present invention has numerous advantages. Firstly, the present invention increases the thermal efficiency of the engine, by increasing the length of expansion stroke at low engine speeds and loads and also by increasing the length of the compression stroke for all engine speeds. The present invention also reduces the amount of fuel/air mixture that is exhausted from the cylinder without being combusted. Obviously, this feature increases the fuel economy of the engine and also reduces the hydrocarbon emissions of the engine.

We claim:

1. An internal combustion engine comprising a cylinder;

at least one piston reciprocable within the cylinder;
an exhaust passage;
an exhaust port allowing communication of the cylinder with the exhaust passage the exhaust port being opened and closed by the piston when the piston reciprocates in the cylinder;

movable shutter means for varying the effective area of the exhaust port, the movable shutter means varying the effective area cyclically in a timed relationship with reciprocal motion of the piston within the cylinder;

sensor means for measuring one or more operating characteristics of the engine and for generating signals corresponding thereto, and a control unit which processes the signals generated by the sensor means and controls motion of the shutter means in accordance with the signals generated by the sensor means, wherein:

the shutter means comprises a shutter and a transmission mechanism for oscillating the shutter between a first position in which the exhaust port has a first effective area and a second position in which the exhaust port has a second smaller effective area;

the shutter is in or close to the first position thereof when the piston passes the shutter whilst moving from the top dead centre position thereof towards the bottom dead centre position thereof;

the shutter is in or close to the second position thereof when the piston passes the shutter on moving from the bottom dead centre position thereof towards the top dead centre position thereof; and the control unit varies the first position of the shutter with changes in sensed operating characteristics to advance or retard the opening of the exhaust passage.

2. An internal combustion engine as claimed in claim 1 adapted for operating on a two-stroke cycle wherein the cylinder has a cylindrical wall in which one or more transfer ports are defined and the shutter has a lower level which is below the highest level of the uppermost transfer port when the shutter is in the second position thereof.

3. An internal combustion engine as claimed in claim 2 wherein the motion of the shutter during the period between the uncovering of the transfer ports by the piston and the piston reaching bottom dead centre is motion towards the second position of the shutter, whereby the effective area of the exhaust port is reduced to reduce loss of fresh charge from the cylinder.

4. An internal combustion engine as claimed in claim 1 wherein the transmission mechanism is connected to the piston and comprises a plurality of interconnected links and an electro-mechanical device connected to one of the interconnected links and the control unit controls the electro-mechanical device to alter the configuration of the interconnected links to vary the first position.

5. An internal combustion engine as claimed in claim 4 wherein the piston is connected to an output crankshaft and the transmission comprises a first shaft on which the shutter is rotatably mounted for cyclical motion on rotation of the first shaft and a second shaft connected by pulley means to the output crankshaft of the engine, the first and second shafts being connected by the plurality of interconnected links.

6. An internal combustion engine as claimed in claim 1 adapted for operating on a two-stroke cycle wherein the cylinder has a cylindrical wall in which one or more transfer ports are defined and the shutter has a lower level which aligns with the highest level of the uppermost transfer port when the shutter is in the second position thereof.

7. An internal combustion engine as claimed in claim 6 wherein the motion of the shutter during the period between the uncovering of the transfer ports by the piston and the piston reaching bottom dead centre is motion towards the second position of the shutter, whereby the effective areas of the exhaust port is reduced to reduce loss of fresh charge from the cylinder.

8. An internal combustion engine as claimed in claim 1 wherein the second position of the shutter is constant for all first positions of the shutter.

9. An internal combustion engine as claimed in claim 1 wherein the sensor means measures engine speed and generates a signal corresponding thereto.

10. An internal combustion engine as claimed in claim 1 wherein the sensor means measures engine load and generates a signal corresponding thereto.

11. An internal combustion engine as claimed in claim 1 wherein the sensor means measures the temperature of coolant used in the engine and generates a signal corresponding thereto.

12. An internal combustion engine as claimed in claim 1 wherein the sensor means measures the rotational speed of the output crankshaft of the engine to measure engine speed and the pressure of the gases in an inlet manifold of the engine to measure engine load.

13. An internal combustion engine comprising at least one piston reciprocating within a cylinder and an exhaust port allowing communication of the cylinder with an exhaust passage, wherein movable shutter means is provided to vary the effective area of the exhaust port, which shutter means comprises a shutter member pivotally mounted within a recess in the exhaust passage and oscillated by a transmission mechanism between a first position in which the shutter member is disposed within the recess and a second position in which the shutter member extends out of the recess to reduce the effective area of the exhaust port, wherein the transmission mechanism comprises a first shaft attached to the shutter member, a first link fixed at one end to the first shaft an pivotally connected at the other end to a first end of a second link, the second link being pivotally connected at second end thereof to first ends of third and fourth links, the third link being pivotally connected at a second end thereof to a crankshaft which is connected to the working crankshaft of the engine and rotates therewith and the fourth link being pivotally connected at the second end thereof to one end of a fifth link which is mounted for rotation about a fixed axis a second end thereof, rotation of the fifth link about the fixed axis varying the geometrical interconnection of the links such that the first position of the shutter is varied.

14. An internal combustion engine as claimed in claim 13 wherein the fifth link is rotated about the fixed axis by an electro-mechanical device controlled by an electrical controller.

15. An internal combustion engine as claimed in claim 14 wherein the electrical controller varies the first position of the shutter with changes in engine temperature.

16. An internal combustion engine as claimed in claim 14 wherein the electrical controller varies the first position of the shutter with changes in engine speed and with changes in engine load.

17. An internal combustion engine as claimed in claim 14 wherein the electrical controller varies the first position of the shutter with changes in engine speed and with changes in engine temperature.

18. An internal combustion engine as claimed in claim 14 wherein the electrical controller varies the first position of the shutter with changes in engine load and with changes in engine temperature.

19. An internal combustion engine as claimed in claim 14 wherein the electrical controller varies the first position of the shutter with changes in engine speed, with changes in engine load and with changes in engine temperature.

20. An internal combustion engine as claimed in claim 14 wherein the electrical controller varies the first position of the shutter with changes in engine speed.

21. An internal combustion engine as claimed in claim 14 wherein the electrical controller varies the first position of the shutter with changes in engine load.

22. An internal combustion engine as claimed in claim 13 wherein the electro-mechanical device is a servo-motor.

23. An internal combustion engine as claimed in claim 13 wherein the fourth link is rotated about the fixed axis by an electro-mechanical device controlled by an electronic controller.

24. An internal combustion engine as claimed in claim 23 wherein the electronic controller varies the first position of the shutter with changes in engine speed and with changes in engine load.

25. An internal combustion engine as claimed in claim 23 wherein the electronic controller varies the first position of the shutter with changes in engine speed and with changes in engine temperature.

26. An internal combustion engine as claimed in claim 23 wherein the electronic controller varies the first position of the shutter with changes in engine load and with changes in engine temperature.

27. An internal combustion engine as claimed in claim 23 wherein the electronic controller varies the first position of the shutter with changes in engine speed, with changes in engine load and with changes in engine temperature.

28. An internal combustion engine as claimed in claim 23 wherein the electronic controller varies the first position of the shutter with changes in engine speed.

29. An internal combustion engine as claimed in claim 23 wherein the electronic controller varies the first position of the shutter with changes in engine load.

30. An internal combustion engine as claimed in claim 23 wherein the electronic controller varies the first position of the shutter with changes in engine temperature.

31. An internal combustion engine as claimed in claim 13 wherein rotation of the fourth link does not vary the second position of the shutter.

* * * * *

UNITED STATES PATENT AND TRADEMARK OFFICE
CERTIFICATE OF CORRECTION

PATENT NO. : 5,337,707
DATED : August 16, 1994
INVENTOR(S) : David W. Blundell and Neil D. Wilson It is certified that error appears in the above-indentified patent and that said Letters Patent is hereby corrected as shown below:

On the title page: Item [30]

Under FOREIGN PATENT DOCUMENTS, "0413318A1" should be --0413317A1--.

Column 11, Line 40 (Claim 13, Line 15), cancel "an" and insert --and--

Signed and Sealed this

Tenth Day of January, 1995

Attest:

BRUCE LEHMAN

Attesting Officer     Commissioner of Patents and Trademarks